April 18, 1944.  E. M. SPLAINE  2,346,709
EYE SHIELD FOR OPHTHALMIC MOUNTINGS
Filed April 7, 1941
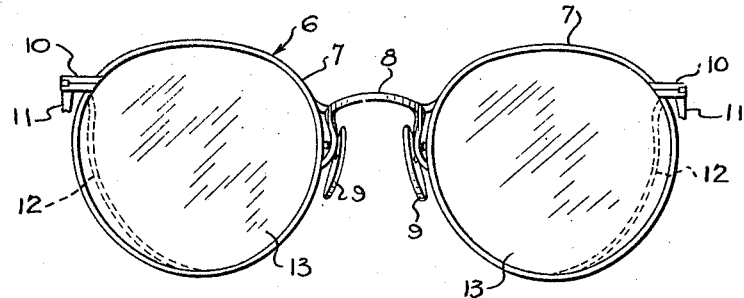
Fig. I
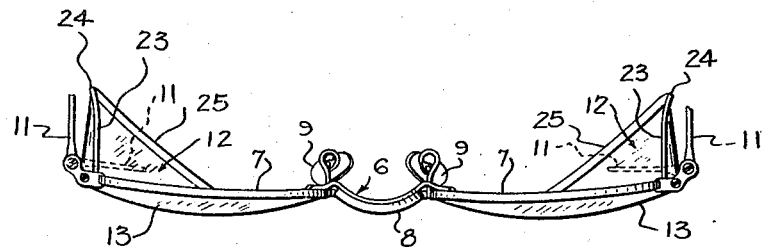
Fig. II
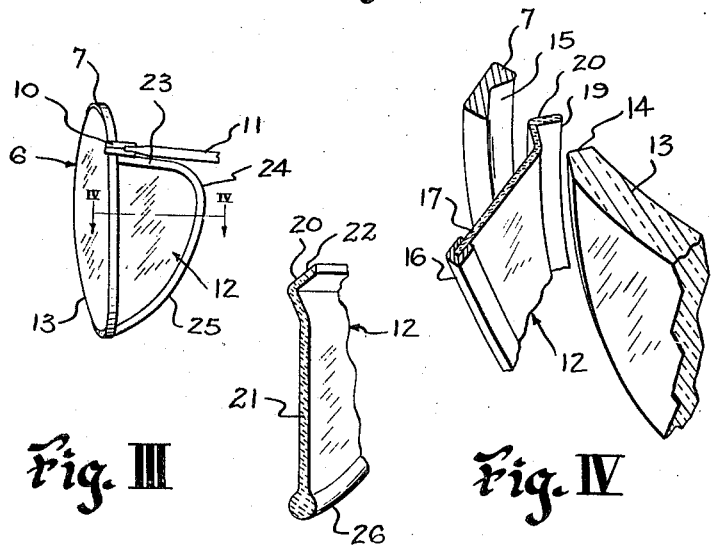
Fig. III  Fig. IV
Fig. V
INVENTOR.
EDWARD M. SPLAINE
BY Louis L. Gagnon
ATTORNEY.

Patented Apr. 18, 1944

2,346,709

UNITED STATES PATENT OFFICE 2,346,709

EYE SHIELD FOR OPHTHALMIC MOUNTINGS

Edward M. Splaine, Southbridge, Mass., assignor to American Optical Company, Southbridge, Mass., a voluntary association of Massachusetts Application April 7, 1941, Serial No. 387,224

9 Claims. (Cl. 2—13)

This invention pertains to ophthalmic devices and more particularly to a deflecting element commonly referred to as a shield which is interchangeable on a mounting employing preferably a split lens-rim, but may be used on an eye wire of the closed type.

It is a primary object of the invention to provide a light or particle deflecting element known as a shield, for use in conjunction with an ophthalmic mounting having the temple connected to said mounting at a point above the useful field of side vision when the mounting is on the face.

A further object of the invention is to provide a deflecting element used in conjunction with an ophthalmic mounting of the above character wherein the deflecting element is so formed as to be insertable intermediate the lens and the lens-rim with the upper portion of the deflecting element engaging the lens at a point above the optical center of said lens and extending rearwardly and downwardly with a free peripheral edge which conforms substantially to the contour of the cheek bone of the face of the wearer in the vicinity of the outer portion of the orbital brim.

A further object is to provide a shield to be used interchangeably on an ophthalmic mounting of the split lens-rim type said shield to substantially close the opening between the lens-rim and the face from a point just below the temple to the lower center of the lens-rim.

A further object of the invention is to provide a shield which is formed to have one edge thereof connected intermediate the lens and the lens-rim with the highest point located approximately at the upper outer edge of the lens while the lowest point will engage the lens-rim in the area of the bottom center portion of the lens.

A further object of the invention is to provide a light and particle deflecting element for permanent connection to an ophthalmic mounting being so disposed as to permit the temples to be folded to a normally closed position without moving or altering the position of the deflecting element.

A still further object is to provide an ophthalmic mounting of the commercially known Ful-Vue type wherein a deflecting element may be interchangeably connected intermediate the lens and the lens-rim.

Other objects and advantages will become apparent from the following description taken in connection with the accompanying drawing, and it will be apparent that many changes may be made in the details of the construction, arrangement of parts, and steps in the process without departing from the spirit of the invention as expressed in the accompanying claims. The exact details shown and described are preferred forms only shown by way of illustration and are not to be considered as limitations.

Referring to the drawing:

Fig. I is a front view of the ophthalmic mounting having the temple support connected to the lens-rim at the upper and outer edge thereof, with the deflecting means shown dotted, and part of the temple removed.

Fig. II is a top view of the ophthalmic mounting shown in Fig. I having the invention connected thereto, and a dotted portion to indicate that the temples may be folded to a closed position without removing the deflecting member.

Fig. III is an end view of Fig. I showing a general contour and shape of the light and particle deflecting member connected to the ophthalmic mounting with the upper end of the deflecting member connected below the temple support.

Fig. IV is an exploded view, partly broken away, taken substantially along lines IV—IV of Fig. III showing the formed groove in the deflecting member to have a formed fit with the lens and the inner surface of the lens-rim.

Fig. V is a cross sectional view, partly broken away, of a modification of the deflecting element showing a bead formed as an integral part of the deflecting element on the free peripheral edge thereof.

Throughout the application it is to be understood that the expression "Ful-Vue" mounting is an ophthalmic mounting having the temples and temple lugs connected to the lens-rims above the useful field of side vision when the mounting is being worn on the face.

Heretofore, ophthalmic mountings which employ a light deflecting or dust particle deflecting element, commonly referred to as a shield, were usually constructed of a heavy material which was mechanically fastened to the lens-rim or connected to a special holding mechanism which was not appealing to the eye. Further, the device is so manufactured as to have utility only with the type of ophthalmic mounting which had the highest point of the shield below the temple support which point was below a horizontal plane of the optical center of the lens. In cases where this general construction is not adhered to, and the shield is of the rigid type extended above the temple, the rigid shield would obstruct rotational movement of the temple on its support and prevent the temples from being operable in a folding manner.

If the deflecting element did permit the temples to be rotational about their pivotal connection to the temple support, and the deflecting element extended above the temples, a hinge was required for the deflecting element so that it might be bent out of the way for the folding process. It was not uncommon to find the deflecting element acting as a temple support to impart the foldable quality to the temples.

In all of the above cited constructions the deflecting element and mounting generally lacked delicacy in appearance and frequently a deficiency in eye protection was endured by certain individuals rather than subject themselves to even a fanciful unpleasantness of wearing the cumbersome appearing goggle type of ophthalmic mountings.

The present invention embraces features which are extremely delicate in construction and appearance having a minimum amount of material and mechanism to produce the desired result of an interchangeable shield suitable to wear by the gentler individual with a refined taste in eye wear.

Referring to the drawing and more particularly to Fig. I, an ophthalmic mounting 6 has lenses 13 supported in lens-rims or eye wires 7 intermediately connected by a bridge 8 having nose pads 9 connected to the ophthalmic mounting. Temple supports 10 are of the split type for use with the split lens-rim 7 and have partially broken away temples 11 pivotally connected thereto. The shields 12 are shown dotted. It will be noted that the free peripheral edge of the deflecting elements have a generally smaller radius than the lens-rim, the purpose being to permit the deflecting element to more naturally conform to the contour of the face.

The top view shown in Fig. II shows the light deflecting elements 12 connected to the lens-rim 7 while the temple per se extends beyond the deflecting elements. Dotted portions 11 show that the temples may be bent inwardly to a folded position while the deflecting element remains in its normally operative position.

The end view shown in Fig. III discloses that the lower portion of the deflecting element 12 is so inclined as to conform to the contour of the face along the line of the face substantially engaged by the deflecting element. The lowest extremity of the deflecting element has been gradually merged with the mounting so that no bulge or awkward appearing lines are present. The upper portion of the deflecting element sharply engages the lens-rim and it will be noted that the substantially longitudinal portion 23 of the deflecting element is inclined to follow the angle of inclination of the temple support and temple connected thereto. The gradual inclination of the upper horizontal edge of the shield gives the deflecting element a stream-lined effect. While this shape of the upper peripheral edge is desirable, it is to be understood that it is not absolutely necessary to follow strictly the disclosure presented herein since the upper longitudinal peripheral edge may be somewhat varied, without having any undesirable effect on the operation of the invention.

Since the invention generally contemplates use with the mounting of the Ful-Vue type any angle or contour may be used on the upper portion of the shield provided it is substantially above the optical center of the lens and affords sufficient side protection.

The exploded view in Fig. IV shows the lens 13 having a V-shaped peripheral edge 14 thereon. The lens-rim 7 has a V-shaped groove 15 therein and ordinarily would receive the peripheral edge 14 of the lens 13 if the shield were omitted. The cross sectional view of the deflecting element has an independent edge or rim 16 which is connected to the free peripheral edge of the deflecting element. The peripheral edge may be made of any suitable material such as plastic, fiber, or even metal. The material used will naturally depend on the desired results from a point of appearance and function. The particle shield body 17 has a V-shaped formation adjacent its inner peripheral edge and is adapted to have opposing sides thereof engage the groove in the groove in the lens-rim and the V-shaped peripheral edge of the lens. The length of the right side of the V formation as shown in Fig. IV, is of sufficient length to extend substantially to the point 18 of the lens. In this respect, the lens-rim and lens will generally merge in appearance with the edge 19 of the shield or deflecting element 12. The upper and lower edge extremities of the deflecting element may be molded or cut by grinding or other suitable means in such a way as to permit the lens to gradually engage the lens-rim at the upper and lower extremities of the deflecting element. By doing this, the tightening of the lens-rim will substantially close any gap at the extremities of the deflecting element where it engages the lens and the lens-rim.

The thickness of the deflecting member may be varied for different types of ophthalmic mountings but it is generally believed that a comparatively thin material will be used provided it has qualities suitable for obtaining the desired results. The edging 16 on the free peripheral edge of the shield adds rigidity to the deflecting element so that it conforms to the established contour lines under normal usage and also increases the area of contact with the face at said edge.

The cross sectional view of the modification shown in Fig. V is substantially the same at its inner peripheral edge in that it has a V-shaped formation 20 substantially the same as the V-shaped formation 20 on the deflector 17 in Fig. IV. The outer or free peripheral edge of the Fig. V showing has a bead or bulge 26 thereon which bulge is molded of the same material as the deflecting element so that homogeneity persists throughout the bulge or bead and the shield or deflecting element.

The shield body 21 in Fig. V, and 17 in Fig. IV, may be of any suitable material depending on the particular task for which the deflecting element is intended.

The deflecting element or shield comprises in general a main body portion 12 which is curved in substantially one direction in an arc simulating the outer lower contour shape of the lenses 13 on the temporal sides thereof. In instances when the shield is transparent it is preferably formed of synthetic resinous materials or other desirable transparent plastics. In instances when the said shield is opaque it may be of any desirable material such as plastics, metals, Bakelites, pressed paper or any other suitable material. In instances when the said shields are transparent the material of said shields may have embodied therein means for retarding the visible as well as the invisible portions of the spectrum. For example, the said material may have embodied therein suitable means for absorbing infra-red or ultra-violet rays and may conform to different colors and different light absorbing characteristics commonly known in the art.

The said main body portions 12, in addition to being curved as described above, are provided with an inner or forward peripheral edge portion 22 which is grooved to fit between the adjacent contour edge of the lens and the V-groove 15 of the lens-rim 7. The upper edge portions 23 of the shields are disposed in a horizontal direction but are preferably inclined rearwardly to substantially follow the inclination of the temples and are so positioned relative to the temple endpieces or supports 19 as to permit the ready folding of the temples to a closed or folded position relative to the lenses. The upper inclined portions 23 extend rearwardly and blend into a curved portion 24 of a relatively short radius and thence turn downwardly to a curved edge portion 25 of a relatively long radius which extends forwardly to the lens-rims at a point adjacent the vertical center line of the lenses. The entire contour edge portion of the shield extending from the grooved edge thereof is provided with a channelled reinforcing rim portion or edging 16 which is fitted to the contour edge of the shield and then secured thereto as by clamping or by the use of suitable adhesive or the like. This rim portion 16 may be formed of a metal or of a material having similar characteristics of the material of the shield.

Although the inner contour edge portion 25 is described as being formed to a relatively long radius as compared with the radius of curvature of the portion 24 it is to be understood that the said contour edge portion is preferably shaped to fit the general contour shape of the outer bony structure of the orbital brim of the individual wearing the mounting. This shape is arrived at by a cut and try method so as to fit the greatest majority of individuals with the said edge having a relatively intimate fit with the contour of the face at said location. The mounting is adapted to be fitted with the face so that the shield members 12 will provide a substantially complete protective closure at the sides of the mounting beneath the temples and extending to substantially the lower center portion of the lenses.

The said mounting is so fitted with the face that the edge portion such as 17 will follow substantially the shape of the face at the sides with the flesh covering the outer bony structure of the orbital brim functioning as filler means between the bony structure of the face and the contour edges 12 of the shields. Care is taken that the mounting is so fitted that the shield will not have a definite bearing pressure on the face so as to cut into the flesh and hurt the wearer. This shape, as stated above, is such that it will fit in this relaxation with the majority of individuals wearing such mountings. The portions 16 and integral bead 25 while functioning as reinforcing means for strengthening the shields also provide an increased area of contact with the face so as to be more comfortable during use. Such mountings have a particular use in industry by individuals who do bench work along side of each other where there is a danger of having particles projected from the means being worked on by one worker into the eye of another worker and is designed particularly to be exceptionally light on the face and comfortable to the wearer, being particularly adapted for use by females.

From the foregoing, it will be seen that a deflecting element made of various materials may be used interchangeably on an ophthalmic mounting of the split lens-rim type, having the shield to protect the eye from light and/or particles of foreign material which would reach the area below the temples between the face and the mounting.

In commercial practice, the method and means employed may involve changes from the specific disclosure set forth herein and minor changes may readily suggest themselves. The right to make certain minor departures from the specifications and drawing is retained and equivalent parts may be used within the spirit of the invention as defined by the subjoined claims.

Having described my invention, I claim:

1. An ophthalmic mounting of the class described comprising a pair of lenses, lens-rims for receiving said pair of lenses, said lens-rims being joined by a bridge member and each lens-rim having divided portions normally located above the useful field of side vision when the device is in position for use on the face, said divided portions each having a lug securely mounted thereon for joining said divided lens-rim portions, temples connected to the divided lugs on each of said lens-rims for joining said meeting ends of the lens-rim, a shield removably secured to each of said lens-rims, means for connecting each of said shields intermediate the lens and the lens-rim having the uppermost portion of said shield connected beneath the lower lug of the divided portions in each of said lens-rims, the upper edge extending rearwardly at an inclination substantially parallel with the temple, and pivotal means to permit the temples to be folded inwardly while the shield remains in its normally operative position.

2. An ophthalmic mounting of the class described comprising a pair of lenses, lens-rims for receiving said pair of lenses, said lens-rims being joined by a bridge member and each lens-rim having divided portions normally located above the useful field of side vision when the device is in position for use on the face, said divided portions each having a lug securely mounted thereon for joining said divided lens-rim portions, temples connected to the divided lugs on each of said lens-rims for joining said meeting ends of the lens-rim, a shield removably secured to each of said lens-rims, means for connecting each of said shields intermediate the lens and the lens-rim having the uppermost portion of said shield connected beneath the lower lug of the divided portions in each of said lens-rims, a separate edging securely connected to the outer peripheral edge of the shield, said edging having one termination on the shield at a point substantially contiguous with the lens-rim just below the temple support and the other termination substantially contiguous with the lens support at the lower central portion thereof, the general contour shape of the outer peripheral edge being substantially the same as the general contour shape of the face about the orbital brim of the eye below the temple so that the shield forms substantially a complete closure for the normally open portion between the lens-rim and the face below the temples.

3. An ophthalmic mounting of the class described comprising a pair of lenses having V-shaped edges formed therein, lens-rims having V-shaped grooves therein for receiving said pair of lenses, said lens-rims being joined by a bridge member and each lens-rim having divided portions normally located above the useful field of side vision when the device is in position for use on the face, said divided portions each having a lug securely mounted thereon for joining said divided lens-rim portions, temples connected to the divided lugs on each of said lens-rims for joining said meeting ends of the lens-rim, a shield removably secured to each of said lens-rims, a V-shaped portion adjacent the inner peripheral edge of the shield to be gripped intermediate the lens and the portion of the lens-rim below the temple support, a bulge on the outer peripheral edge of the shield extending from a point beyond the V-shaped groove of the shield on the upper edge to a point substantially contiguous with the V-shaped groove on the lower edge, and means permitting pivotal action of the temples so that they may be closed inwardly without disturbing the normally operative position of the shield in relation to the ophthalmic mounting.

4. A device of the class described comprising a pair of lenses, supporting rims joined by a bridge member and having divided portions normally located above the useful field of side vision when the device is in position for use on the face, said divided end portions each having a connecting lug thereon for joining said meeting ends and to which suitable temples are pivotally attached, lenses in said lens supporting rims, and shield members secured to the device on the temporal sides thereof, said shield members having an inner peripheral edge portion formed to lie between edges of the lenses and the adjacent portion of the lens supporting rims, said shields each having a peripheral bulge being greater in diameter than the thickness of the shield, the thickness of the peripheral bulge adjacent the lens rim being reduced to substantially the same thickness as the shield.

5. A device of the character described comprising a pair of lens supporting rims joined by a bridge member and having divided portions normally located above the useful field of side vision when the device is in position of use on the face, said divided end portions each having a connection lug thereon for joining said meeting ends and to which suitable temples are pivotally attached, lenses in said lens supporting rims and shield members secured to the device adjacent the temporal sides thereof, said shield members having an inner peripheral edge portion shaped to lie between the contour edges of the lenses and the adjacent portion of the lens supporting rims, an upper edge portion shaped to lie adjacent the forward end of the temple and the connecting lugs and slightly below the lower edge of the temple to permit said temples to be folded and having an outer peripheral edge portion shaped substantially to the general contour shape of the outer bony structure of the orbital brim of the eye and being adapted to follow the general lines of the face below the temples when the device is in use.

6. An ophthalmic mounting of the class described comprising a pair of lenses, a lens supporting structure for said lenses embodying lens rims joined by a bridge member and having temple endpieces on the temporal sides thereof located above the useful field of side vision, a shield on the temporal sides of each of said lenses having means connecting said shields to said temporal sides of the mounting with the major portions of the shields extending rearwardly of the lens rims and located below the temple endpieces and out of contact with temples connected to said endpieces whereby said temples may be folded transversely of the tops of the respective shields without the said shields interfering with said folding, said shields having a rear contour edge portion shaped substantially to follow the general contour shape of the outer bony structure of the orbital brim of the eyes of an individual when the mounting is on the face.

7. An ophthalmic mounting of the class described comprising a pair of lenses, a lens supporting structure for said lenses embodying lens rims joined by a bridge member and having temple endpieces on the temporal sides thereof located above the useful field of side vision, side shields for said mounting having means adjacent the front contour edges of said shields for connecting said shields to the mounting with the major portion of the shields lying below the temple endpieces and out of contact with temples carried by said endpieces, the said shields having a relatively flat upper contour edge portion extending rearwardly and thence curving downwardly to a rear edge portion which, in turn, extends downwardly and forwardly to a point adjacent the lens rims substantially midway of the bottom contours thereof whereby the temples may be folded transversely of the tops of the respective shields without the said shields interfering with said folding.

8. Protective shields for use with an ophthalmic mounting comprising a pair of lenses and a lens supporting structure for said lenses embodying a pair of lens rims joined by a bridge member and having temple endpieces on the temporal sides thereof located above the useful field of side vision, said protective shields being formed of a relatively rigid material and having connecting means adjacent one edge thereof adapted to be connected with the ophthalmic mounting on the temporal sides thereof with the major portion of said shields lying below the temple endpieces and out of contact with temples carried by said endpieces, said shields having a relatively flat upper contour edge portion adapted to extend rearwardly of the mounting when in position thereon with said upper contour edge turning downwardly and blending with a rear contour edge portion which curves downwardly and forwardly and in a direction toward the vertical center line of the lenses when associated therewith whereby the temples may be folded transversely of the tops of the respective shields without the said shields interfering with said folding.

9. Protective shields for use with an ophthalmic mounting comprising a pair of lenses and a lens supporting structure for said lenses embodying a pair of lens rims joined by a bridge member and having temple endpieces on the temporal sides thereof located above the useful field of side vision, said protective shields being formed of a relatively rigid material and having connecting means adjacent one edge thereof adapted to be connected with the ophthalmic mounting on the temporal sides thereof with the major portion of said shields lying below the temple endpieces and out of contact with temples carried by said endpieces, said shields having a relatively flat upper contour edge portion adapted to extend rearwardly of the mounting when in position thereon with said upper contour edge turning downwardly and blending with a rear contour edge portion which curves downwardly and forwardly and in a direction toward the vertical center line of the lenses when associated therewith whereby the temples may be folded transversely of the tops of the respective shields without the said shields interfering with said folding, said shields being formed of a self-supporting material of a transparent nature.

EDWARD M. SPLAINE.